…

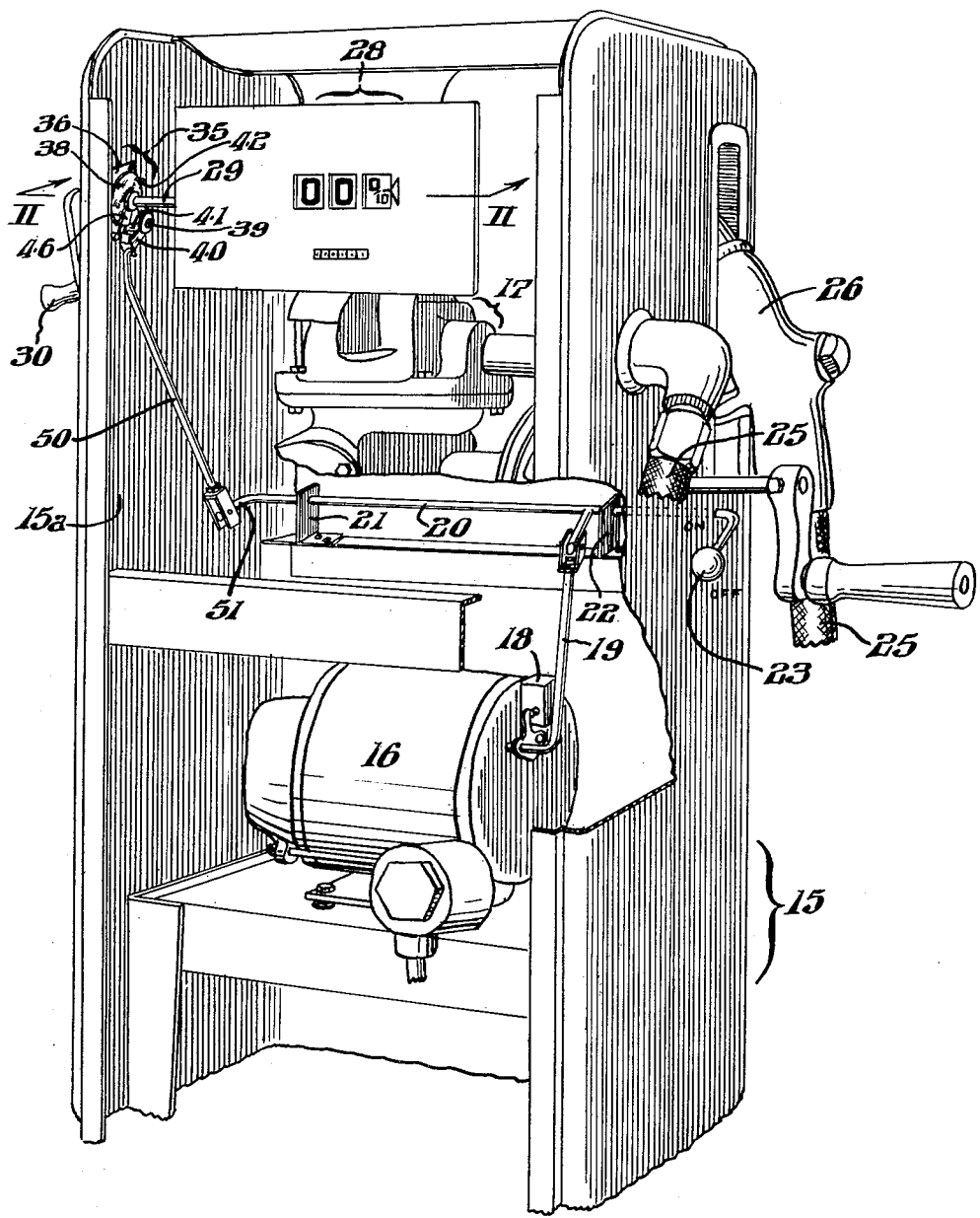

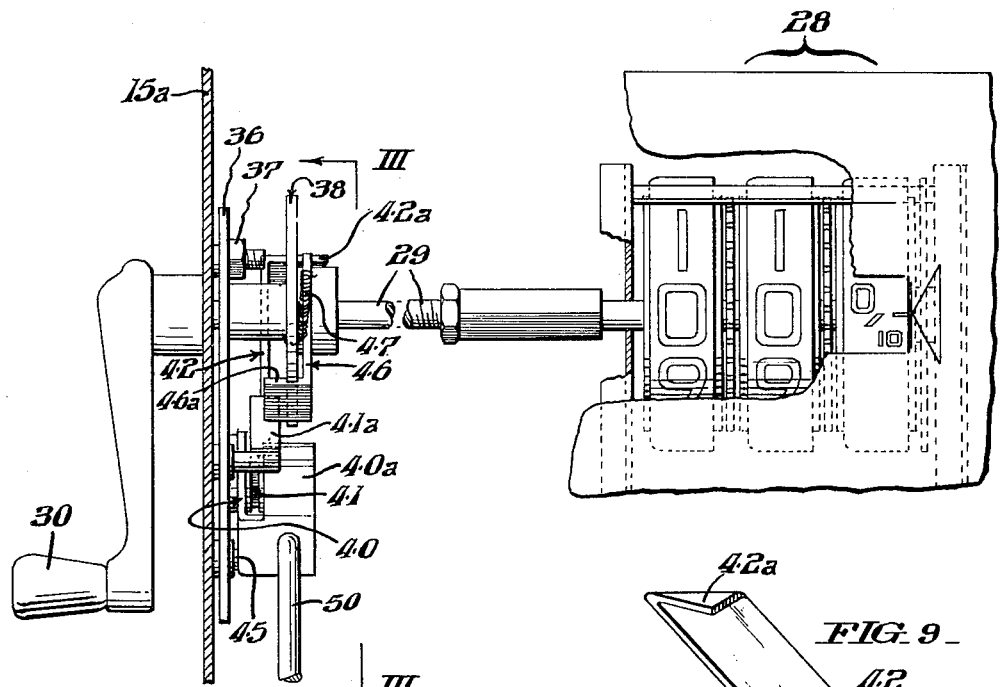
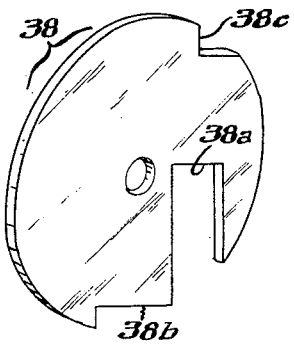
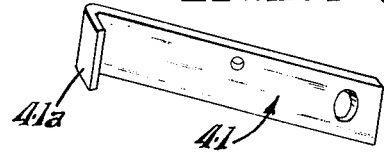
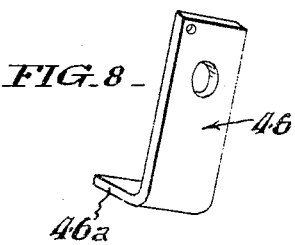
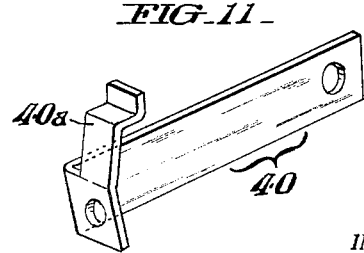

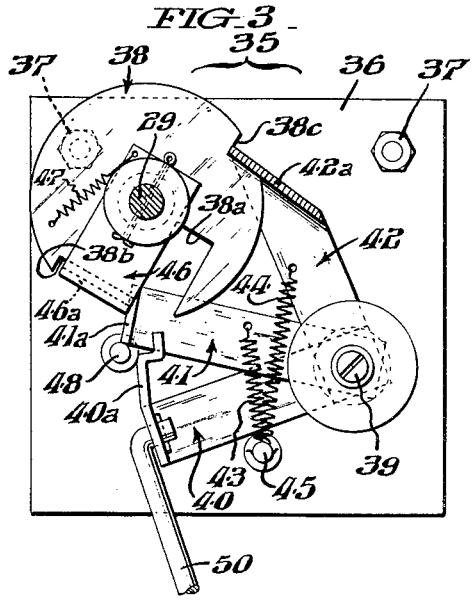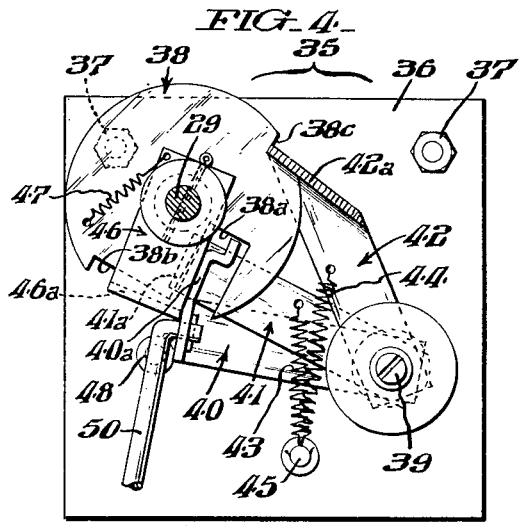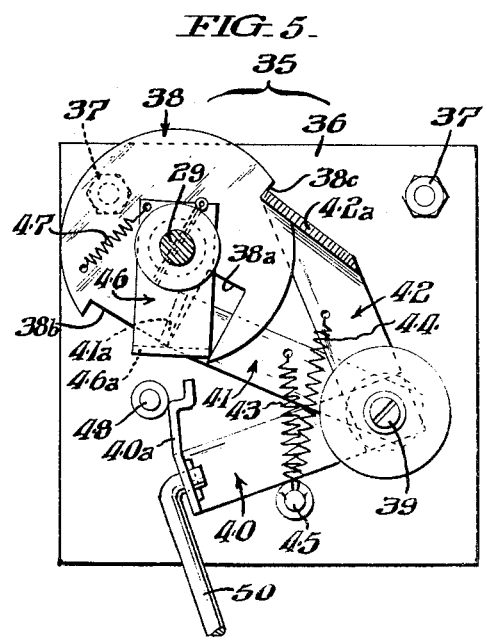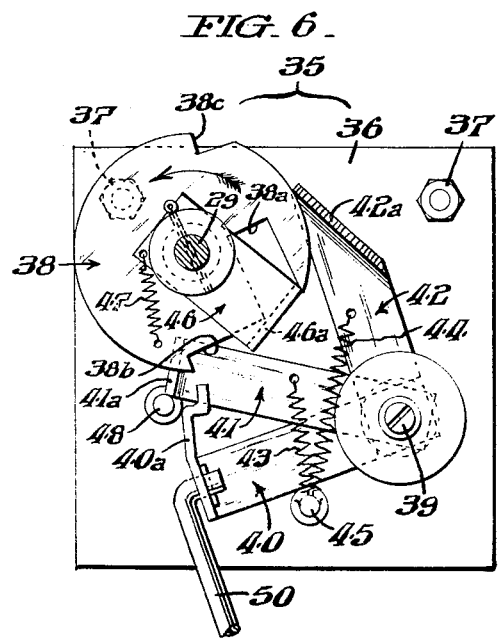

United States Patent Office 3,008,608
Patented Nov. 14, 1961

3,008,608
INTERLOCK MEANS
Ronald M. Wilson, Ambler, Leighton Dunning, Philadelphia, and John B. Madill, North Hills, Pa., assignors to William M. Wilson's Sons, Lansdale, Pa.
Filed June 3, 1959, Ser. No. 817,753
2 Claims. (Cl. 222—35)

This invention relates to interlock means for preventing re-starting an apparatus having a meter with an associated register, until the register is reset to zero at the completion of each operative cycle of the apparatus such, for example, as apparatus for dispensing gasoline or other liquid commodities.

The chief aim of our invention is to provide a simple foolproof interlock means in the form of an attachment which is readily installed in apparatus of the kind referred to at small cost; which is sturdy against easy derangement and does not therefore require frequent repairs; and which will lock the apparatus against being re-started until the register is reset to zero after each use of the apparatus and so prevent either inadvertent or purposeful accumulation at any time of more than one delivery of the liquid commodity.

Other objects and attendant advantage will appear from the following detailed description of the attached drawings, wherein:

FIG. 1 is a perspective view of a metering gasoline dispensing apparatus with the front panel of its casing removed to expose the parts in the interior including the interlock means of our invention.

FIG. 2 is a fragmentary view of the apparatus partly in elevation and partly in section taken as indicated by the angled arrows II—II in FIG. 1 and drawn to a larger scale, showing the interlock means.

FIG. 3 is a cross section taken as indicated by the angled arrows III—III in FIG. 2.

FIGS. 4-6 are views similar to FIG. 3 showing the parts of the interlock means in successive positions.

FIGS. 7-11 are perspective views of the various component parts of the interlock means.

The dispensing apparatus chosen for convenience of exemplifying our invention in FIG. 1 has, as shown in FIG. 1, an upright columnar casing 15 with the front panel thereof removed. Disposed in the lower part of the casing 15 is an electric motor 16 which, through suitable transmission (not shown) serves to drive a pump 17 in the upper part of the casing. The motor 16 is in circuit with a switch 18 mounted on said motor, said switch being operable through a link 19 from a horizontal shaft 20 which is rotatively supported in fixed bearings 21 and 22 within the casing, and actuatable from the exterior of the casing at the right-hand side by an arm 23. To the outlet of the pump 17 is connected a delivery hose 25 of which the discharge nozzle is indicated at 26. The direct reading register comprehensively designated 28 is operated through gearing (not shown) in the usual way from the meter, and is of the type having a reset shaft 29 operable by a hand crank 30 exteriorly of the left-hand side of the casing.

The interlock means with which the present invention is more especially concerned is generally designated 35 in FIGS. 1-6 of the drawings and, as shown, comprises a mounting plate 36 which is secured by bolts 37 interiorly of the left-hand side wall 15a of the casing 15 as best seen in FIG. 1. Affixed to the reset shaft 29 of the register 28 adjacent the plate 36, is a disk 38 having a notch 38a, a recessed peripheral notch 38b to one side of said notch and a tooth 38c annually spaced substantially by a quadrant from the other side of said notch. Freely fulcrumed on a stud projection 39 of the plate 36 adjacent the disk 38 are an interference or latch element in the form of a finger 40 whereof the end is bent laterally and provided with an upward projection 40a, an arrester element in the form of a finger 41 of which the distal end is laterally bent as at 41a, and a detent 42 having a projection 42a. The arrester finger 41 is normally held retracted against a fixed stop 48 by a spring 43, and the detent 42 yieldingly urged toward the disk 38 by a spring 44, said springs being connected, each at one end, to a fixed anchorage 45 on the plate 36.

From FIG. 2 it will be noted that the fingers 40 and 41 and the detent 42 are disposed at one side of the disk 38, and that a gate element 46 is disposed at the opposite side of said disk and of which the distal end is laterally offset as at 46a to under-reach the disk 38. The spring shown at 47 tends to swing the gate element 46 counterclockwise about the shaft 29. As further shown, the latch finger 40 is connected through a link rod 50 with an arm 51 on the shaft 20, as shown in FIG. 1. Normally, the moving parts of the interlock means 35 occupy the positions in which they are shown in FIGS. 1-3 i.e., with the latch finger 40 lowered and its end projection 40a withdrawn from the notch 38a of the disk 38, with the end of the arrester finger 41 resting upon the fixed stop 48 on the plate 36 and holding the gate element 46 retracted against the pull of the spring 47 from over the notch in the disk, and with the detent 42 engaging the tooth 38c of the disk.

Operation

As the actuating arm 23 is moved to "on" position (FIG. 1) the switch 18 is closed and the motor 16 started to drive the pump 17 for delivery of the gasoline in the usual way through the hose 25 under control of the nozzle 26, the register 28 being incidentally actuated to indicate the amount of the gasoline being dispensed. Due to being connected, through the link rod 50, to the arm 51 on the shaft 20, the latch finger 40 of the interlock means 35 is moved upward about the stud 39 and its projection 40a thereby entered into the notch 38a of the disk 38, as shown in FIG. 4. In being moved, as just explained, the latch finger 40 engages the arrester finger 41 from beneath and lifts it against the pull of the spring 43 with the result that the end 41a of the said arrester finger is withdrawn from the end of the gate element 46 which, by the spring 47, is swung slightly about the register resetting shaft 29 until stopped by engagement with the projection 40a of the latch finger 40 as also shown in FIG. 4. The register resetting shaft 29 is thus locked against counterclockwise rotation to prevent resetting of the register 28 to zero during operation of the motor 16 and dispensing of the gasoline. When the actuating arm 23 is subsequently moved to "off" position after the desired amount of gasoline has been delivered from the apparatus, the latch finger 40 will be swung down to its original position, as in FIG. 5 with attendant retraction of its projection 40a from the notch 38a of the disk 38 and release the gate element 46 which latter will thereupon be swung by the spring 47 to obstruct the notch 38a of the disk 38, as shown in FIG. 5. If an attempt is then made to re-start the motor, the projection 40a of the latch finger 40 will be prevented from entering the notch 38a of the disk 38, as will be readily understood from FIG. 5, until the register 28 is reset to zero by turning the reset shaft counterclockwise as indicated by the arrow in FIG. 6, through a complete revolution, by means of the hand crank 30. Accordingly, after the shaft 29 is so turned from the position in FIG. 5 through the position of FIG. 6, the gate element 46 will eventually be engaged by the arrester finger 41a, as in FIG. 3, and said arrester finger 41 pulled down by the spring 43 against the stop 48, the notch 38a in the disk 38 being thereby cleared to permit starting of the motor for the next dispensing operation of the apparatus. It is to be noted that the detent 42 serves to restrict rotation of the resetting shaft 29 to the direction indicated by the arrow in FIG. 6, and that such rotation is restricted to a single turn for each resetting of the register 20 by engagement of the shoulder of the peripheral recess 38b in the disk, as in FIG. 3, with the gate element 46.

From the foregoing it will be apparent that the interlock means of our invention will prevent either inadvertent or purposeful accumulation, at any one time, of more than one delivery of the liquid commodity. By reason of its simplicity it will be further evident that the device can be produced in quantity at small cost; that it can be easily and quickly installed in existing dispensing apparatus without, in any way, requiring any change in the usual construction of the apparatus or change in its normal mode of operation; and moreover, that it can be relied upon to function over protracted periods without requiring frequent attention for repairs.

While the preferred embodiment of this invention has been described in some detail, it will be obvious to one skilled in the art that various modifications may be made without departing from the invention as hereinafter claimed.

Having thus described our invention, we claim:

1. Interlock means for the resetting shaft of the metering register of a liquid dispensing apparatus having an electric pump driving motor and manual means for actuating a switch in circuit with the motor, said interlock means comprising a disk fixed on the resetting shaft, said disk having a notch and a tooth in its periphery spaced substantially by a quadrant from the notch; a gate element in the form of a spring-biased arm free on the shaft and having a laterally offset end portion to overreach a recess in the periphery of the disk; a detent pivoted on a fixed stud adjacent the disk and normally engaging the tooth of the disk to restrict the shaft to rotation in one direction only; an arrester arm fulcrumed on said stud and having a laterally offset end portion to normally cooperate with the end portion of the gate element in holding the gate element retracted normally from over the notch in the disk; a fixed stop for the arrester finger and a spring for normally maintaining it in engagement with said stop; and a normally retracted latch arm also freely fulcrumed on the stud and connected to the switch actuating means of the dispensing apparatus, said latch arm having a lateral projection underreaching the arrester arm, and also having an upstanding finger projection adapted, as the switch is closed to start the pump motor, and engage into the notch of the disk and thereby lock the shaft against being rotated, with concurrent displacement of the arrester finger for release of the gate element so that, upon subsequent retraction of the latch finger, said gate element is moved by its spring to obstruct the notch of the disk until the shaft is turned through a complete revolution to reset the metering register to zero, with concurrent interception of the gate element by the arrester arm to clear the notch of the disk, and reengagement of the detent with the tooth of said disk.

2. Interlock means characterized as in claim 1, further comprising a mounting plate adapted to be affixed to the inside of one of the casing walls of the dispensing apparatus, said plate being pierced for passage therethrough to the exterior of the meter resetting shaft for attachment of an operating handle, and support of the stud on which the detent, the gate element and the latch arm are pivoted, as well as the stop for the arrester element.

References Cited in the file of this patent

UNITED STATES PATENTS

| 2,126,447 | Brouse et al. | Aug. 9, 1938 |
| 2,311,193 | Wilson | Feb. 16, 1943 |
| 2,413,036 | De Lancey | Dec. 24, 1946 |

FOREIGN PATENTS

| 1,088,909 | France | Sept. 22, 1954 |